(12) United States Patent
Gorinevsky et al.

(10) Patent No.: US 7,222,027 B2
(45) Date of Patent: May 22, 2007

(54) SPATIO-TEMPORAL FILTER FOR STRUCTURAL HEALTH MONITORING

(75) Inventors: Dimitry Gorinevsky, Palo Alto, CA (US); Grant A. Gordon, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/132,600

(22) Filed: May 19, 2005

(65) Prior Publication Data

US 2006/0265146 A1 Nov. 23, 2006

(51) Int. Cl.
*G06F 11/30* (2006.01)
*G01B 5/28* (2006.01)

(52) U.S. Cl. .................... 702/35; 702/34; 702/184

(58) Field of Classification Search ............... 702/34, 702/35–36, 39, 40–43, 48, 81, 91, 182, 185, 702/189, 190, 191, 104–106, 197; 708/809, 708/815, 819; 342/195, 378; 382/254, 260, 382/275; 701/29
See application file for complete search history.

(56) References Cited

U.S. PATENT DOCUMENTS 6,091,361 A * 7/2000 Davis et al. ............ 342/378
6,549,858 B1 * 4/2003 Shelley et al. ........... 702/56
7,103,507 B2 * 9/2006 Gorinevsky et al. ...... 702/184
2004/0193670 A1 * 9/2004 Langan et al. ........... 708/819

OTHER PUBLICATIONS

Bamieh et al., Distributed Control of Spatially Invariant Systems, *IEEE Transactions on Automatic Control*, Jul. 7, 2002, pp. 1091-1107, vol. 47(7), USA.
Dudgeon, "Multidimensional Digital Signal Processing," 1984, Title Page, Copyright Page, and Table of Contents, Prentice-Hall, Inc., Englewood Cliffs, NJ USA.
Gorinevsky et al., "Optimization-Based Tuning of Low-Bandwidth Control in Spatially Distributed Systems," *American Control Conference*, Jun. 4-6, 2003, 1-6, Denver, CO USA.
Gorinevsky et al., "Structured Uncertainty Analysis of Robust Stability for Multidimensional Array Systems," *IEEE Transaction on Automatic Control*, 2003, pp. 1557-1568, vol. 48(8), USA.
Lim, "Two-Dimensional Signal and Image Processing," 1990, Title Page, Copyright Page, and Table of Contents, Prentice-Hall, Inc., Englewood Cliffs, NJ USA.

* cited by examiner

*Primary Examiner*—Bryan Bui
(74) *Attorney, Agent, or Firm*—David N. Fogg; Jay A. Wahlquist; Fogg & Powers LLC

(57) ABSTRACT

A method for estimating damage to a structure is provided. The method includes collecting a plurality of damage estimates over time and filtering the plurality of damage estimates with spatio-temporal filters. The method also includes generating an enhanced damage estimate based on the filtered damage estimate. In other embodiments, a damage estimate system and a computer readable medium having instructions embodied thereon for a method for estimating damage to a structure are provided.

15 Claims, 13 Drawing Sheets

SPATIO-TEMPORAL FILTER FOR STRUCTURAL HEALTH MONITORING

BACKGROUND

Objects such as aircrafts, spacecrafts, ground vehicles, buildings and bridges tend to develop flaws over time. Periodic inspections are performed to monitor possible flaws in these objects and further inspections are scheduled to ensure that flaws have not grown to design limited sizes. An automated method of detecting flaws without in-person inspections is through the use of Structural Health Monitoring (SHM) systems.

Structural Health Monitoring systems are used to generate damage pattern estimates. The SHM systems consist of sensors, electronics hardware, and software that provide an estimate of the damage state of a structure. Because flaws in structures can lead to catastrophic events, possibly causing death, it is important that the damage estimates are reliable.

For the reasons stated above and for other reasons stated below which will become apparent to those skilled in the art upon reading and understanding the present specification, there is a need in the art for a Structural Health Monitoring system that provides reliable damage estimates.

SUMMARY

The above-mentioned problems and other problems are resolved by the present invention and will be understood by reading and studying the following specification.

In one embodiment, a method for estimating damage to a structure is provided. The method comprises collecting a plurality of damage estimates over time and filtering the plurality of damage estimates with spatio-temporal filters. The method also comprises generating an enhanced damage estimate based on the filtered damage estimate.

In one embodiment, a damage estimate system is provided. The system comprises at least one sensor that collects damage estimate data as scans of the structure state and a processing unit that receives the scans from the at least one sensor and generates a damage estimate from each scan. The processing unit applies spatio-temporal filtering to the scans to produce an enhanced damage estimate.

In one embodiment, a damage estimate system is provided. The system comprises means for sensing damage in an object, the means for sensing having an output. The system also comprises means for estimating the damage of the object from the output of the means for sensing and means for improving the accuracy of the means for estimating using multiple outputs generated by the means for sensing.

BRIEF DESCRIPTION OF THE DRAWINGS

The present invention can be more easily understood and further advantages and uses thereof more readily apparent, when considered in view of the description of the embodiments and the following figures in which.

DETAILED DESCRIPTION

In the following detailed description of the embodiments, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

Embodiments of the present invention provide improvements in the operation of Structural Health Monitoring (SHM) systems. The improvements are created by taking multiple SHM damage estimates over a period of time and filtering the multiple damage estimates to achieve decisions about the presence or growing malignancy of any damage condition within a structure.

Figure 1:
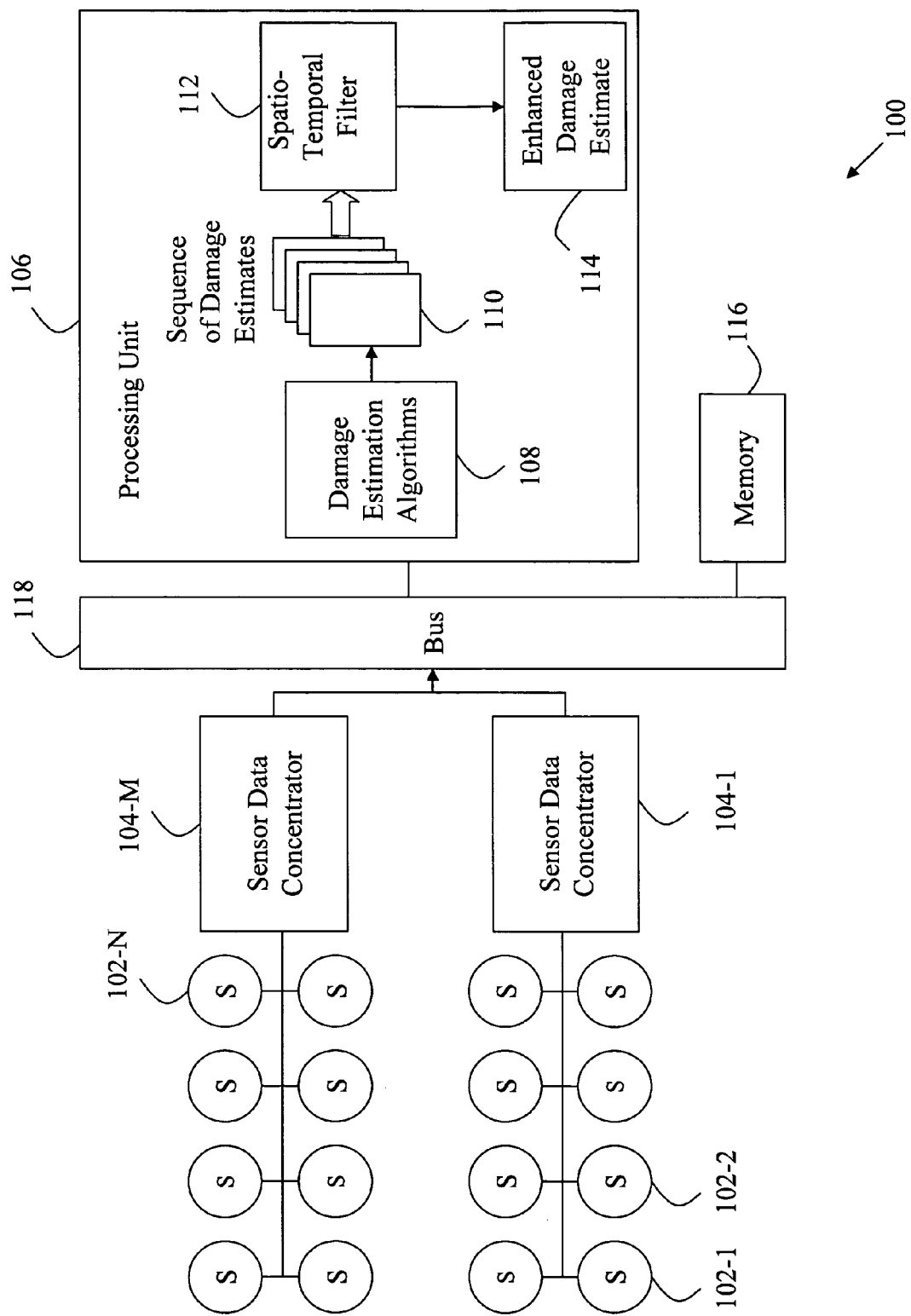
FIG. 1 is a Structural Health Monitoring (SHM) system of one embodiment of the present invention.

FIG. 1 is a Structural Health Monitoring (SHM) system shown generally at 100. Structural Health Monitoring system 100 is composed of sensors 102-1 through 102-N. In one embodiment, Structural Health Monitoring system 100 is composed of only sensor 102-1. Sensors 102-1 through 102-N collect damage estimate data as scans (snapshots) of the structure state and provide this data to sensor data concentrators 104-1 through 104-M. Types of sensing techniques include but are not limited to acoustic emission, ultrasonic Lamb wave, electrical conductivity and strain field sensing.

The sensor data concentrators 104-1 through 104-M accumulate the data from sensors 102-1 through 102-N and digitize the data. The sensor data concentrators 104-1 through 104-M provide the digitized data to a bus 118 which communicates with a processing unit 106 and a memory 116.

In one embodiment, processing unit 106 comprises damage estimation algorithms 108. In one embodiment, damage estimation algorithms 108 perform signal processing of the digitized data received by the data concentrators 104-1 through 104-M. Signal processing provides defect detection, defect location and defect characterization within the region monitored by the sensors 102-1 through 102-N.

The damage estimation algorithms 108 take the defect detection, defect location and defect characterization information and generate a two-dimensional (2-D) damage estimate map for the damage-state of the monitored area at a particular instance. Each scan (snapshot) of the desired region produces a 2-D damage estimate map. Each map is influenced by noise within sensors 102-1 through 102-N, environmental variation, and characteristics of the particular sensors 102-1 through 102-N used to collect the data.

These damage estimate maps generated by the damage estimation algorithms 108 are collected into a sequence 110 of damage estimates. In one embodiment, the damage estimate maps are stored in the memory 116. The sequence 110 of damage estimate maps is provided to the spatio-temporal filter 112 implemented in the processing unit 106. In one embodiment, processing unit 106 implements both the damage estimate algorithms 108 and the spatio-temporal filter 112. In other embodiments, the damage estimate algorithms 108 and the spatio-temporal filter 112 are implemented by multiple processing units 106. Spatio-temporal filter 112 filters out the noise contained in the sequence 110 and produces an enhanced damage estimate 114.

Figure 2:
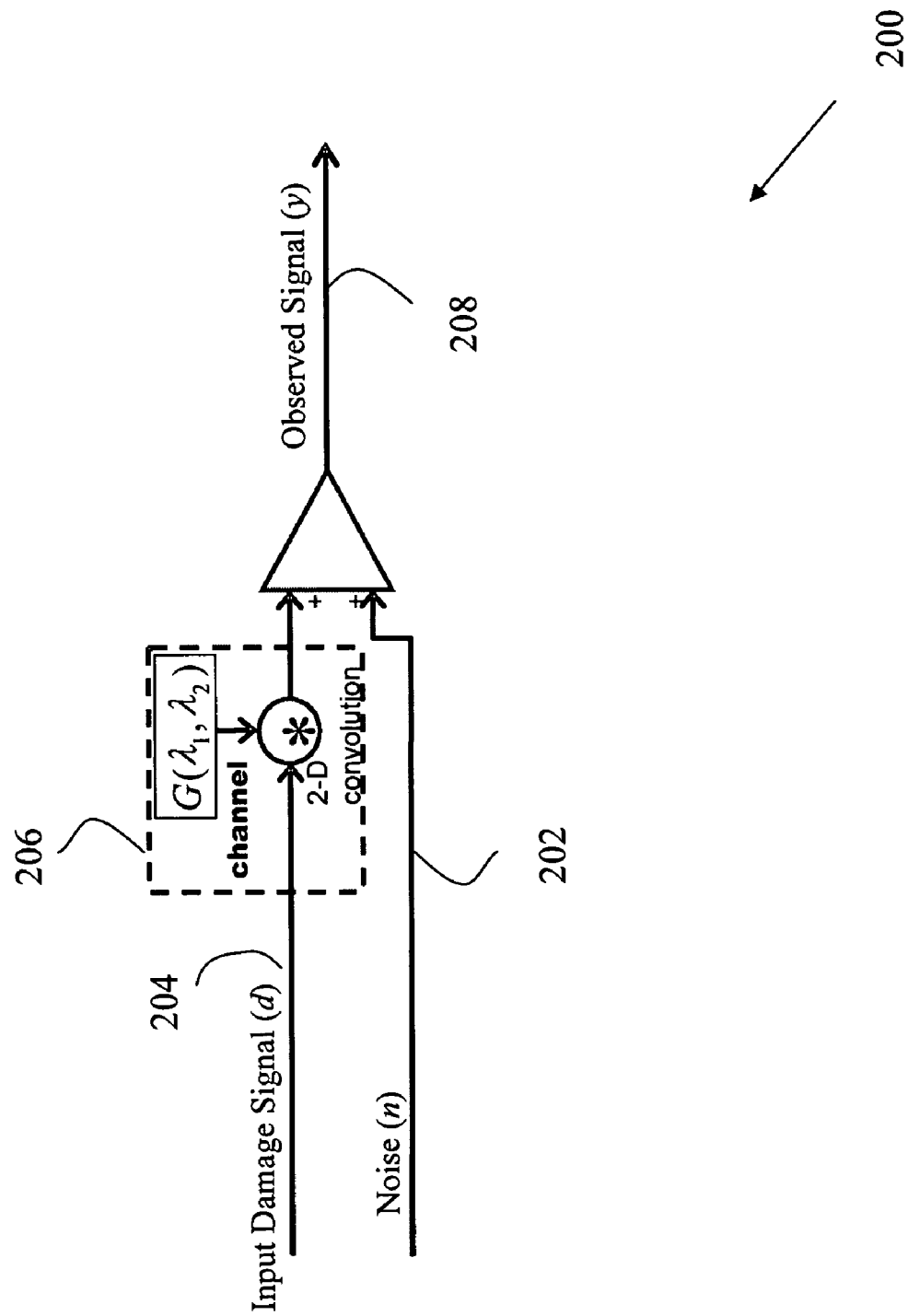
FIG. 2 is one embodiment of a signal model for structure damage filtering and trending.

FIG. 2 is one embodiment of a signal model for structural damage filtering and trending shown generally at 200. In this embodiment, it is assumed that a series of the damage estimate maps can be described as a 2-D spatio-temporal signal $y=y(t,x_1,x_2)$ where y is a scalar damage estimate value, $x_1$ and $x_2$ are integer pixel coordinates of the damage estimate image and t is the integer scan number. It is also assumed that each 2-D damage estimate scan $y=y(t,\cdot,\cdot)$ is composed of an input signal 204 representing the actual structure damage designated as d where $d=d(t,\cdot,\cdot)$ and a damage estimate scatter (noise) 202 designated as n.

It is also assumed that there is distortion in the input signal 204 and the distortion is described as an application of a spatially invariant blur operator (G) 206. Other embodiments assume that the distortion is not spatially invariant. For this embodiment, the blur operator (G) 206 is expressed as a finite impulse response (FIR) kernel of half-width N defined as $$G(\lambda_1, \lambda_2) = \sum_{k=-N}^{N} \sum_{l=-N}^{N} g_{kl} \lambda_1^k \lambda_1^l$$

where $\lambda_1$, $\lambda_2$ are spatial shift operators of unit shift (delay) in the coordinates $x_1$ and $x_2$ respectively. In another embodiment, blur operator 206 is not estimated, but instead identified by applying a localized damage to several points on the desired structure and observing an average damage estimate response obtained in such a controlled experiment.

The combination of the input signal 204, taking into account the blur operator (G) 206, and the noise 202 produces an observed damage estimate signal (observed signal) 208 that is expressed as $Y=G(\lambda_1, \lambda_2)d+n$ The observed signal 208 is a model of the signal sent by the damage estimation algorithms 108 of the processing unit 106 and collected into a sequence of damage estimates 110 shown in FIG. 1.

As shown in FIG. 1, the damage estimation algorithms 108 produce damage estimate scans forming a sequence 110 of damage estimates. This sequence 110 has multiple images and thus the noise introduced within the collection of images arises from two sources, both spatial and temporal.

For temporal noise, it is assumed that the noise is characterized as zero mean additive Gaussian white noise as is the case in other sequential image formation processes such as video camera data. When sensors 102-1 through 102-N are ultrasonic transducers, the spatially dependent noise returned to the ultrasonic transducers is approximated as a non-stationary Gaussian process. The non-stationary nature arises due to radiation spreading that occurs as the ultrasonic energy travels into the material and from the distance dependent attenuation. By selecting on a specific region which is a common distance from a set of transducers used for damage detection, the return energy will have suffered roughly the same levels of distance dependant attenuation and beam spreading. Under these constraints the noise process can be considered stationary. Approximations of the noise introduced by the sensors 102-1 through 102-N vary according to the type of sensor 102-1 through 102-N used in the particular application.

For estimating and filtering the sequence 110, a simple random walk model for the underlying structural damage accumulation and evolution is assumed and is described as $d(t+1,\cdot,\cdot)=d(t,\cdot,\cdot)+e(t,\cdot,\cdot)$ where $e(t,x_1,x_2)$ is white Gaussian noise uncorrelated in space and time. Given the models $y=G(\lambda_1, \lambda_2)d+n$ and $d(t+1,\cdot,\cdot)=d(t,\cdot,\cdot)+e(t,\cdot,\cdot)$, a de-noising filter estimating the signal y in the absence of the noise is needed. In one embodiment, an infinite impulse response filter is used to estimate the signal y in the absence of noise. In other embodiments, other filters are used to estimate the signal y in the absence of noise. The infinite impulse response (IIR) filter is causal in time and non-causal in the spatial coordinates of the form $\hat{y}=F(z, \lambda_1, \lambda_2)y$ where $F(z, \lambda_1, \lambda_2)$ is a rational function of the spatial shift operators $\lambda_1$, $\lambda_2$ and the unit time shift operator z. It is desired that the filter output should be representative of the underlying signal d and reject the disturbance n.

Figure 3:
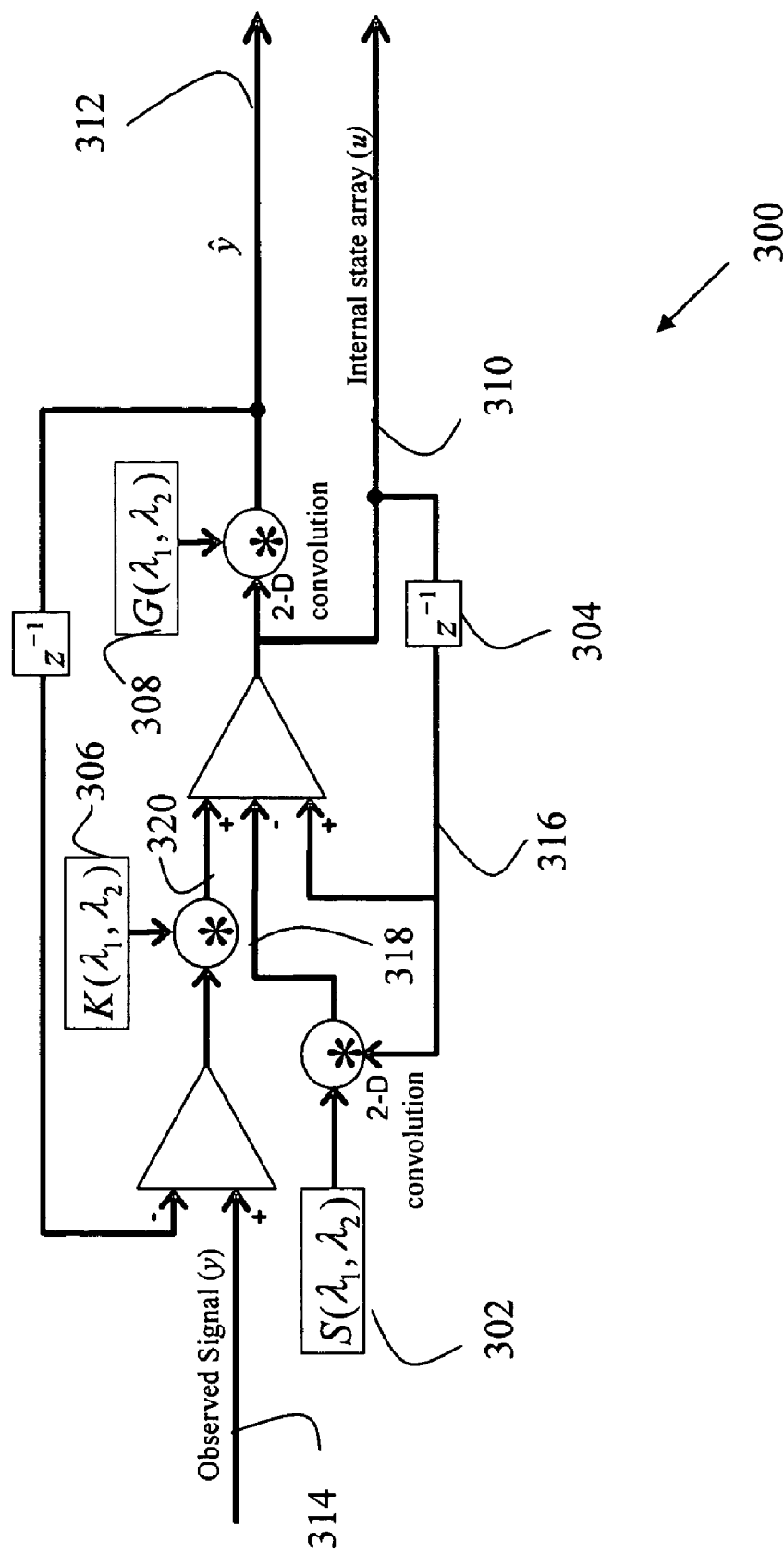
FIG. 3 is one embodiment of a filter structure for filtering a signal with the assumptions of the system model shown in FIG. 2.

FIG. 3 is one embodiment of a filter structure for filtering a signal with the assumptions of the model of FIG. 2 and is shown generally at 300. In this embodiment, an observed signal (y) 314 is input into the filter structure 300. The filter structure 300 assumes that the observed signal (y) 314 is similar in nature to the observed signal 208 model of FIG. 2. The observed signal (y) 314 is combined with a unit time delay operator 304 and undergoes convolution with an operator $K(\lambda_1, \lambda_2)$ 306.

Operator $K(\lambda_1, \lambda_2)$ 306 is a spatial finite impulse response feedback gain operator and is described in further detail in references: i) Gorinevsky, D., Boyd, S., and Stein, G. "Optimization-based tuning of low-bandwidth control in spatially distributed systems," *American Control Conference*, Vol. 3, pp. 2658–2663, Denver, Colo., June 2003 and Gorinevsky, D. and ii) Stein, G. "Structured uncertainty analysis of robust stability for multidimensional array systems," *IEEE Trans. on Automatic Control*, Vol. 48, No. 8, 2003, pp. 1557–1568. The references "Optimization-based tuning of low-bandwidth control in spatially distributed systems," and "Structured uncertainty analysis of robust stability for multidimensional array systems," are incorporated herein by reference.

An internal state array (u) 310 undergoes a unit time delay operation 304 producing a delayed internal state array 316. The delayed internal state array 316 is convolved with a smoothing operator $S(\lambda_1, \lambda_2)$ 302 producing a smoothed delayed internal state array 318. The smoothing operator $S(\lambda_1, \lambda_2)$ 302 is described in further detail in the references: i) "Optimization-based tuning of low-bandwidth control in spatially distributed systems," and ii) "Structured uncertainty analysis of robust stability for multidimensional array systems." Internal state array (u) 310 is an estimate of the input signal (d) 204 in FIG. 2.

The delayed internal state array 316 and the smoothed delayed internal state array 318 are further combined with another feedback signal 320. Feedback signal 320 is produced by convolving the difference between the observed signal 314 and an estimated value of the noise free signal 312, both at time t, with a spatial gain operator $K(\lambda_1, \lambda_2)$ 306.

This combination produces an updated internal state array 310 and is described as $u=z^{-1}u+z^{-1}K(\lambda_1, \lambda_2)(y-\hat{y})-z^{-1}S(\lambda_1, \lambda_2)u$. This equation demonstrates that each new estimate of the damage $u(t+1,x_1,x_2)$ 310 at time t+1 can be computed from the delayed observed signal $u(t,x_1,x_2)$ 316 available at time t and other observed signals 314 and 312 available at time t.

The updated internal state array 310 undergoes convolution with a blur operator $G(\lambda_1, \lambda_2)$ 308. In one embodiment, the blur operator 308 is as described with respect to the blur operator 206 in FIG. 2. This convolution produces a filtered data array 312 expressed by the equation $\hat{y}=G(\lambda_1, \lambda_2)u$.

The motivation for having a filtering update $u=z^{-1}u+z^{-1}K(\lambda_1, \lambda_2)(y-\hat{y})-z^{-1}S(\lambda_1, \lambda_2)u$ and $\hat{y}=G(\lambda_1, \lambda_2)u$ is described below Consider the random walk model $d(t+1,\cdot,\cdot)=d(t,\cdot,\cdot)+e(t,\cdot,\cdot)$ with the linear observation model $y=G(\lambda_1, \lambda_2)d+n$. At each time step, each of the 2-D images can be considered as a vector of high dimension. In one embodiment, a least square estimation of the signal d is computed by Kalman filtering. After a brief initial transient, the Kalman filter update converges to a stationary Kalman filter observer of the form $u=z^{-1}u+z^{-1}L(y-\hat{y})$, where L is the observer gain matrix. In one embodiment, the matrix L in the Kalman filter is obtained by solving a Riccati equation of a large size. The FIR operator K 306 in the update $u=z^{-1}u+z^{-1}K(\lambda_1, \lambda_2)(y-\hat{y})-z^{-1}S(\lambda_1, \lambda_2)u$ is an approximation of the stationary Kalman filter gain. For spatially invariant feedback systems, the feedback gain obtained by solving a stationary Riccati operator equation is known to decay exponentially as described in further detail with respect to the Bamieh, B., Paganini, F., and Dahleh, M. "Distributed control of spatially-invariant systems," *IEEE Trans. on Automatic. Contr.*, Vol. 47, No. 7, July 2002, pp. 1091–1107 reference, so FIR approximation of such an operator is reasonable. The reference "Distributed control of spatially-invariant systems," is incorporated herein by reference.

Consider now $-z^{-1}S(\lambda_1, \lambda_2)u$ the last term in the update $u=z^{-1}u+z^{-1}K(\lambda_1, \lambda_2)(y-\hat{y})-z^{-1}S(\lambda_1, \lambda_2)u$. This term is included because the inverse problem of estimating the underlying image d from the noisy data y is inherently ill conditioned. The term $-z^{-1}S(\lambda_1, \lambda_2)u$ introduces the integrator leakage and regularizes this update making it robust to the modeling uncertainty. In the absence of the regularization term, small but persistent accumulation of error at high spatial frequencies might result from modeling uncertainty. This is described in further detail in references "Optimization-based tuning of low-bandwidth control in spatially distributed systems," and "Structured uncertainty analysis of robust stability for multidimensional array systems."

In order to implement the updates $u=z^{-1}u+z^{-1}K(\lambda_1, \lambda_2)(y-\hat{y})-z^{-1}S(\lambda_1, \lambda_2)u$ and $\hat{y}=G(\lambda_1, \lambda_2)u$ the spatial FIR operators 302 and 306 described above are designed. For a given size of the FIR operators 302 and 306, linear frequency dependent inequalities expressing frequency response and other specifications on the spatial frequency grid lead to a Linear Programming (LP) optimization issue with respect to the FIR kernel coefficients.

The frequency response of the filter 300 depends on the radian frequency co and two spatial frequencies $v_1$ and $v_2$. A frequency response of the sampled filter 300 is obtained by substituting the frequency exponents in place of the spatial shift operators and time shift operators 304 as follows $z^{-1} \to e^{-i\omega}$, $\lambda_1 \to e^{iv_1}$, and $\lambda_2 \to e^{iv_2}$ It is expressed in the form:

$$\hat{y} = \frac{e^{-i\omega}K(e^{iv_1}, e^{iv_2})}{1 - e^{-i\omega} + e^{-i\omega}S(e^{iv_1}, e^{-iv_2}) + e^{-i\omega}K(e^{iv_1}, e^{iv_2})G(e^{iv_1}, e^{iv_2})} y$$

A stop band and a pass band of this frequency response for filter 300 are chosen such as to filter out the noise and while keeping the useful SHM signal.

Figure 4:
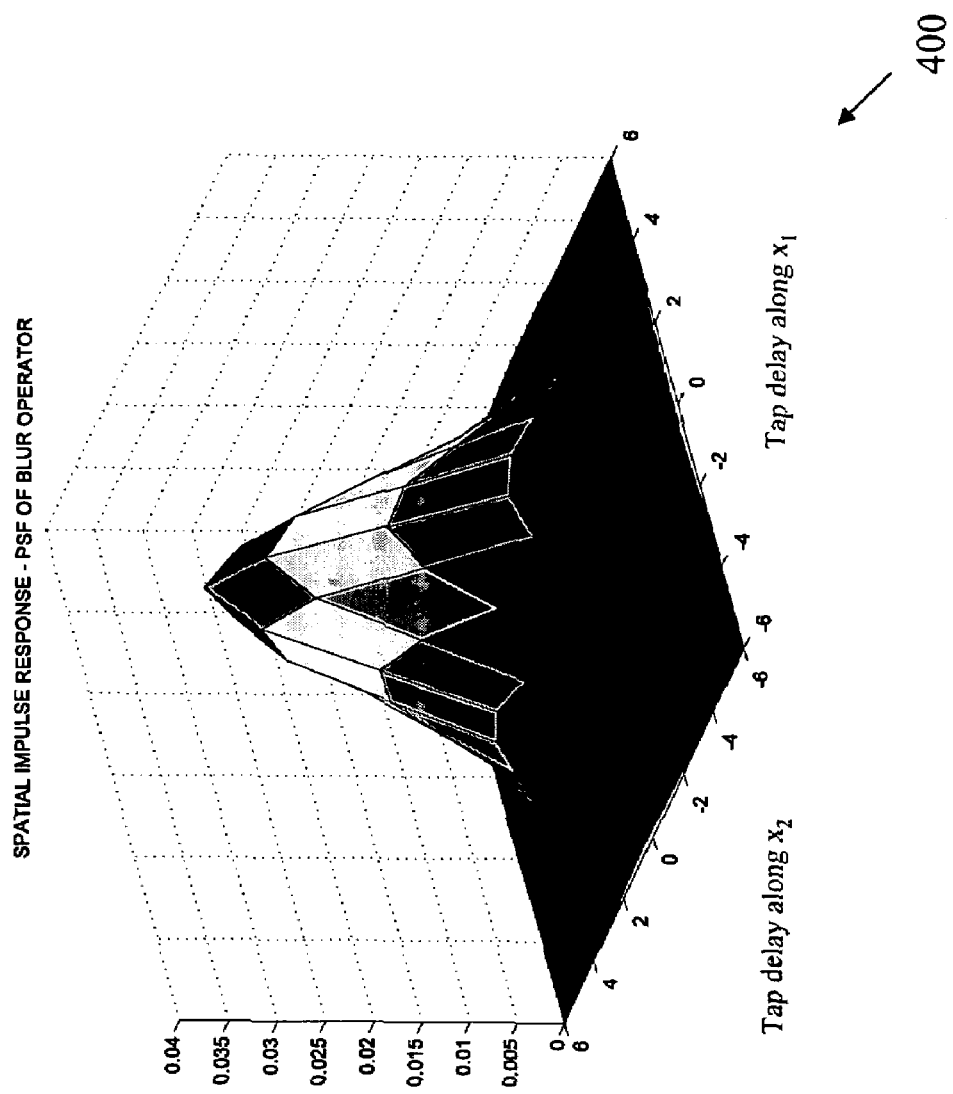
FIG. 4 is one embodiment of the blur operator $G(\lambda_1, \lambda_2)$ of FIG. 3.

FIG. 4 is one embodiment of the blur operator 308 of FIG. 3 shown generally at 400. In this embodiment, blur operator 400 is a FIR operator with maximal delay of ±6 taps (spatial locations) and has a Gaussian shape. Blur operator 400 has a circular symmetry, which is expressed as a 8-fold symmetry on the rectangular image pixel grid. Multidimensional filter symmetry types and other technical details of multidimensional filtering are described in further detail in Dudgeon, D. E. and Mersereau, R. M. *Multidimensional Digital Signal Processing*, Prentice-Hall, 1984 and Lim, J. S. *Two-dimensional Signal and Image Processing*, Prentice-Hall, Englewood Cliffs, N.J., 1990 references. The *Multidimensional Digital Signal Processing* and *Two-dimensional Signal and Image Processing* references are incorporated herein by reference. The same type of symmetry was assumed in the design of the filter FIR feedback operators 302 and 306 of FIG. 3.

Figure 5:
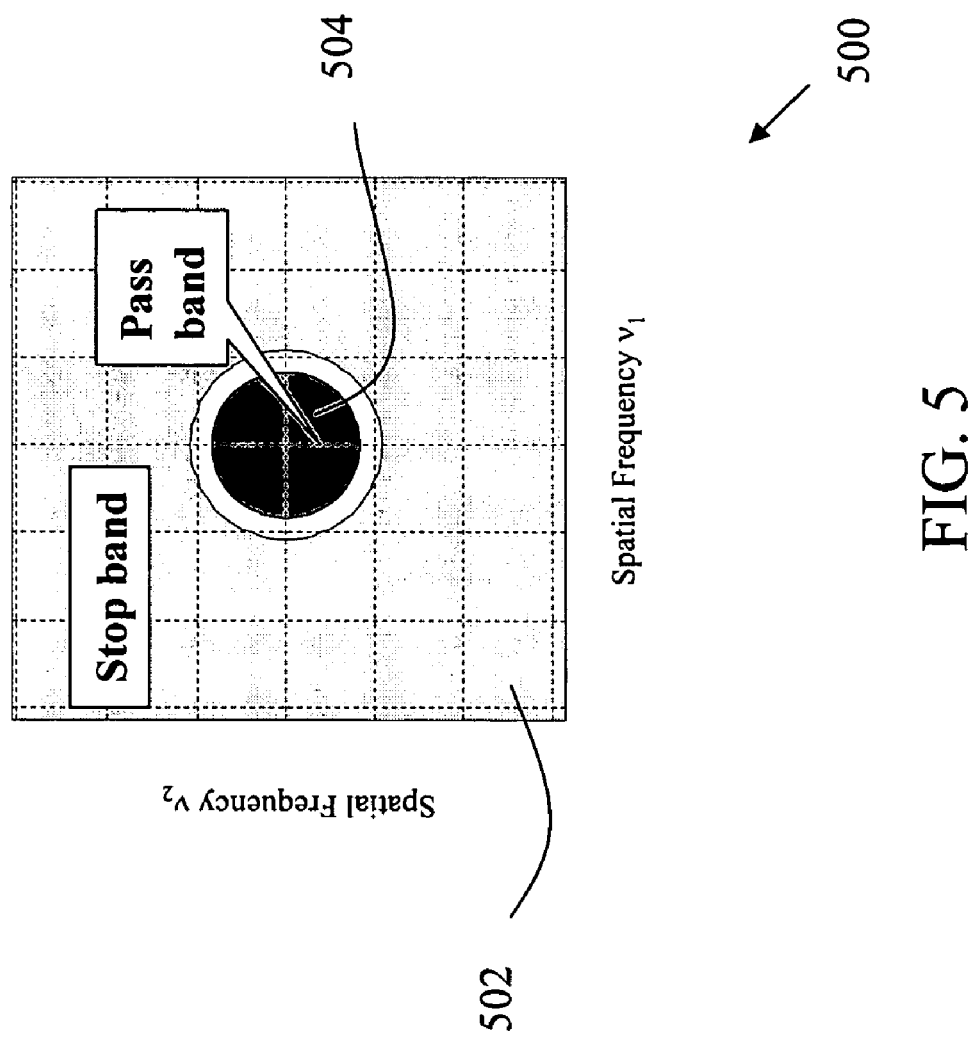
FIG. 5 is one embodiment of a pass band and stop band in the two-dimensional spatial frequency domain.

FIG. 5 is one embodiment of a pass band and stop band in the 2-D spatial frequency domain shown generally at 500. The parameters used for the pass band 504 and the stop band 502 are application dependent and are based on the FIR operators 302 and 306. In this embodiment, the pass band 504 was selected for frequencies where $|G(e^{iv_1}, e^{iv_2})| \geq 0.25$ and the stop band 502 was selected for frequencies where $|G(e^{iv_1}, e^{iv_2})| \leq 0.1$. In one embodiment, in determining the pass band spatial frequencies, the time constant of the filter's dynamic response should in general be no more than 3–4 time samples to ensure a sufficiently rapid response to the sudden appearance of a new damage signal in the filter 300 output. In one embodiment, in determining the stop band spatial frequencies, the time constant of the filter's dynamic response should in general be at least 5–6 time samples to ensure heavy suppression of noise in the stop band 502.

In one embodiment, the steady-state magnitude response of the filter 300 (response for dynamical frequency $\omega=0$) should not deviate more than 25% (plus/minus 2.5 dB) from unity over the pass band spatial frequencies to ensure that the damage information is not excessively distorted by the filter 300. In one embodiment, the steady-state magnitude response of the filter 300 should not exceed 0.05 (or −23 dB) for the stop band spatial frequencies to ensure that high frequency noise outside of the useful signal bandwidth is not amplified. In another embodiment, the steady-state magnitude response of the filter 300 should not exceed 0.5 (or −3 dB).

Figure 6:
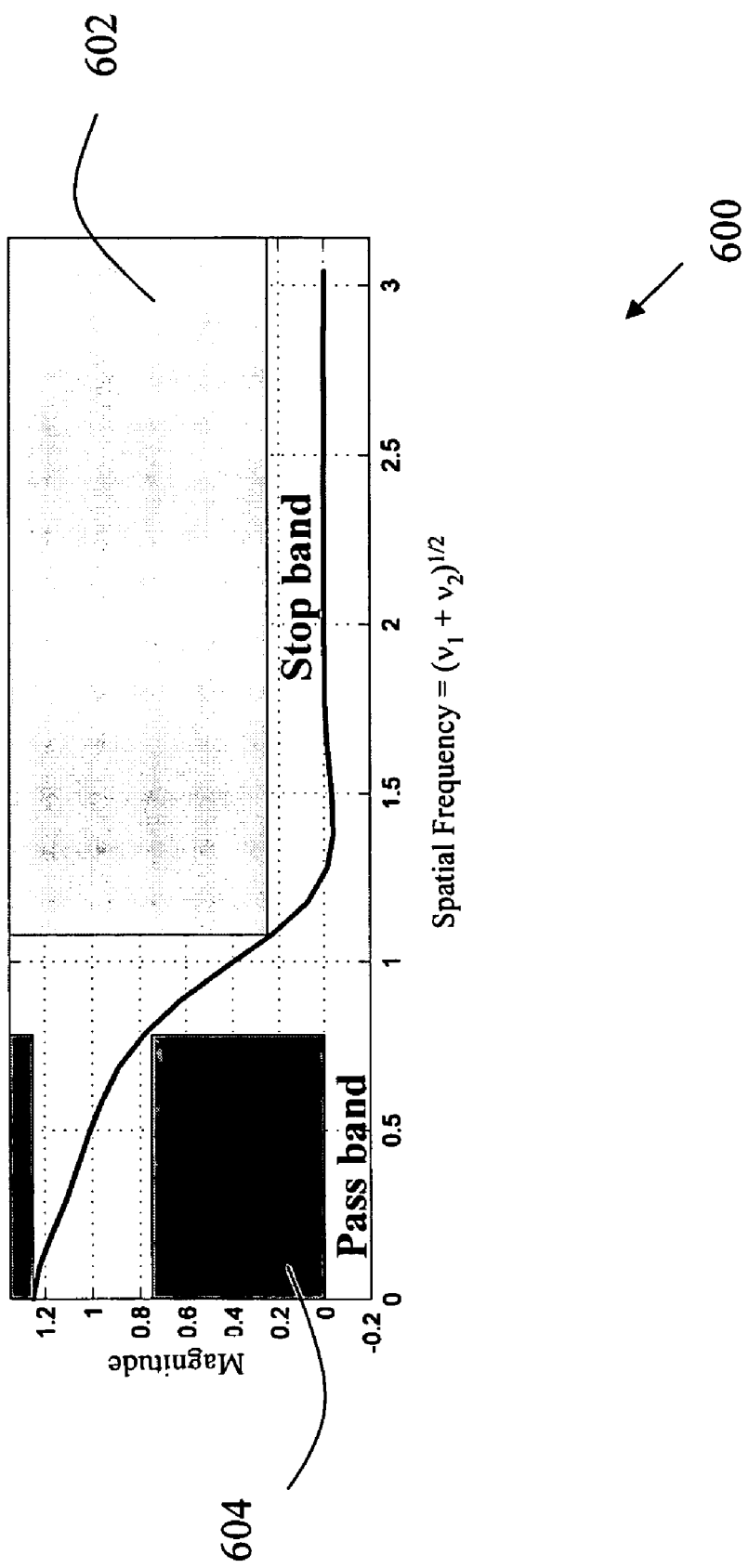
FIG. 6 is one embodiment of magnitude response for a filter transfer function.

FIG. 6 is one embodiment of magnitude specifications for the filter transfer function $$\hat{y} = \frac{e^{-i\omega}K(e^{iv_1}, e^{iv_2})}{1 - e^{-i\omega} + e^{-i\omega}S(e^{iv_1}, e^{-iv_2}) + e^{-i\omega}K(e^{iv_1}, e^{iv_2})G(e^{iv_1}, e^{iv_2})} y$$

shown generally at 600. The magnitude specifications are for the steady-state ($\omega=0$) magnitude and are expressed as the function of the two spatial frequencies $v_1$ and $v_2$. In this embodiment, a pass band 604 and a stop band 602 are shown. In one embodiment, pass band 604 and stop band 602 correspond to the pass band 504 and the stop band 502 of FIG. 5. The pass band 604 and the stop band 602 filter out undesirable noise while preserving the actual damage information producing an enhanced damage estimate 114 as shown in FIG. 1.

Figure 7:
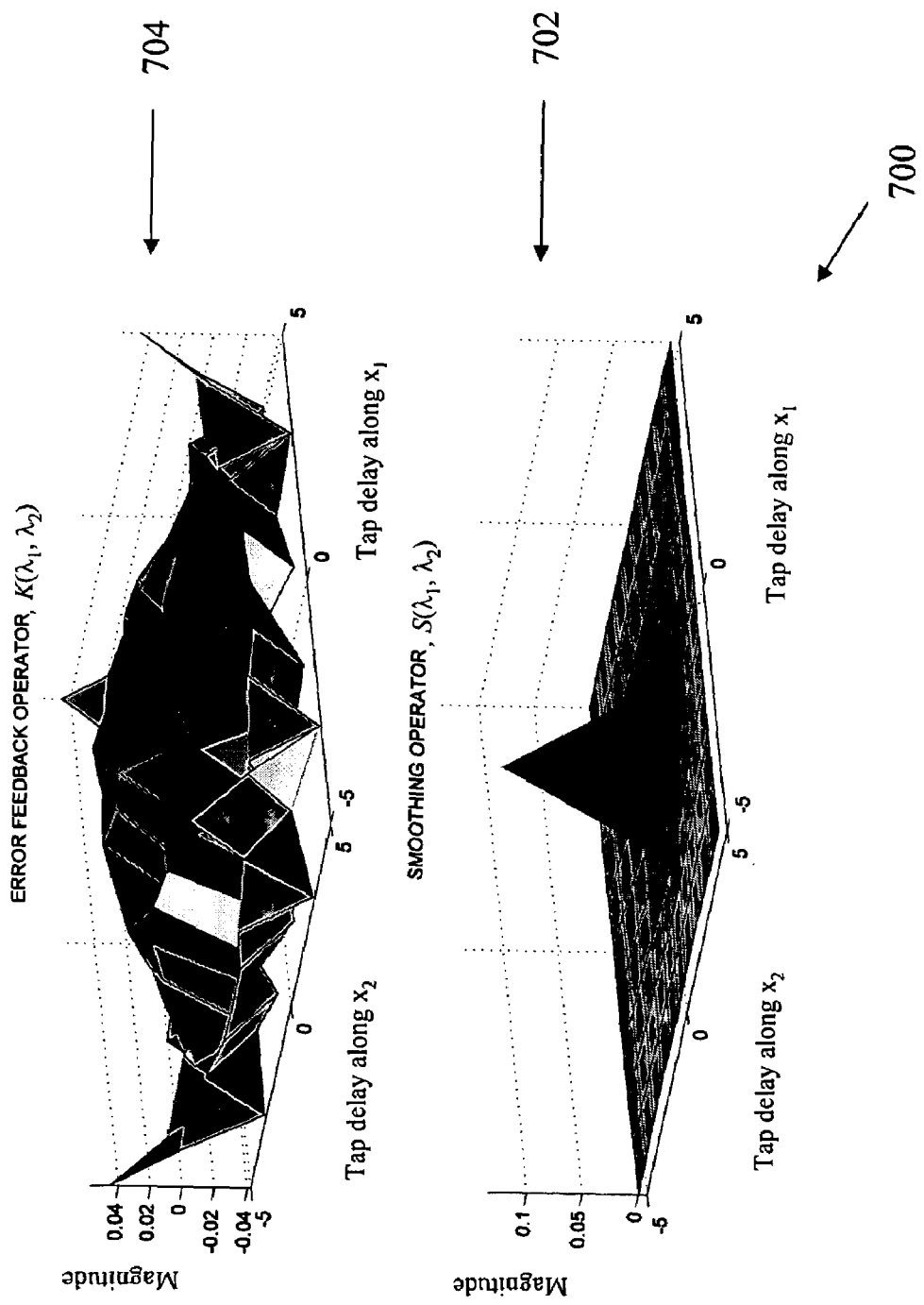
FIG. 7 is one embodiment of the finite impulse response of operators $K(\lambda_1, \lambda_2)$ and $S(\lambda_1, \lambda_2)$ of FIG. 3.

FIG. 7 shows one embodiment of the two update FIR operators 302 and 306 of FIG. 3 shown generally at 700. The upper plot 704 shows weights of the 2-D FIR operator K 306 as a function on the tap delays (offsets) along two spatial coordinates. The plotted operator 306 has nonzero weights from −5 to 5 taps in each coordinate direction. The lower plot 702 illustrates the smoothing operator S 302 plotted in the same format as the operator K 306. The central (zero tap delay) weight of operator S 302 is positive and much larger that the rest of the weights that are negative. At the same time, the sum of all the weight of the plotted operator 302 is very close to zero, making a zero gain at the spatial frequency (0,0).

Figure 8:
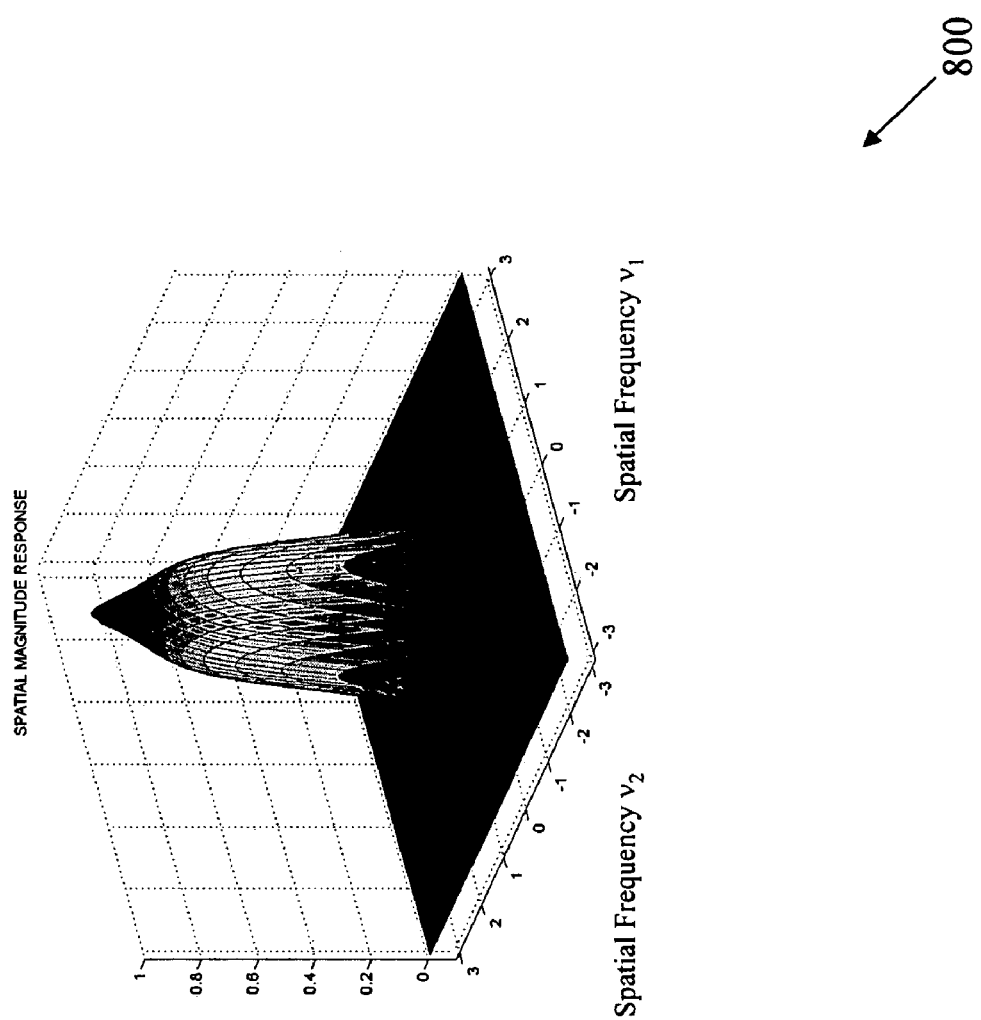
FIG. 8 is one embodiment of the magnitude response of the spatio-temporal filter shown in FIG. 3.

FIG. 8 is one embodiment of the magnitude response of the filter 300 of FIG. 3 shown generally at 800. In this embodiment, the steady-state ($\omega=0$) magnitude response depends on the two spatial frequencies $v_1$ (corresponding to spatial frequency 1) and $v_2$ (corresponding to spatial frequency 2). Using the above embodiments of design requirements for the filter 300, the magnitude of the frequency response is within 20% of the unity within the pass-band 504 and falls off to be less that 0.25 (−12 dB) within the stop band 502.

Figure 9:
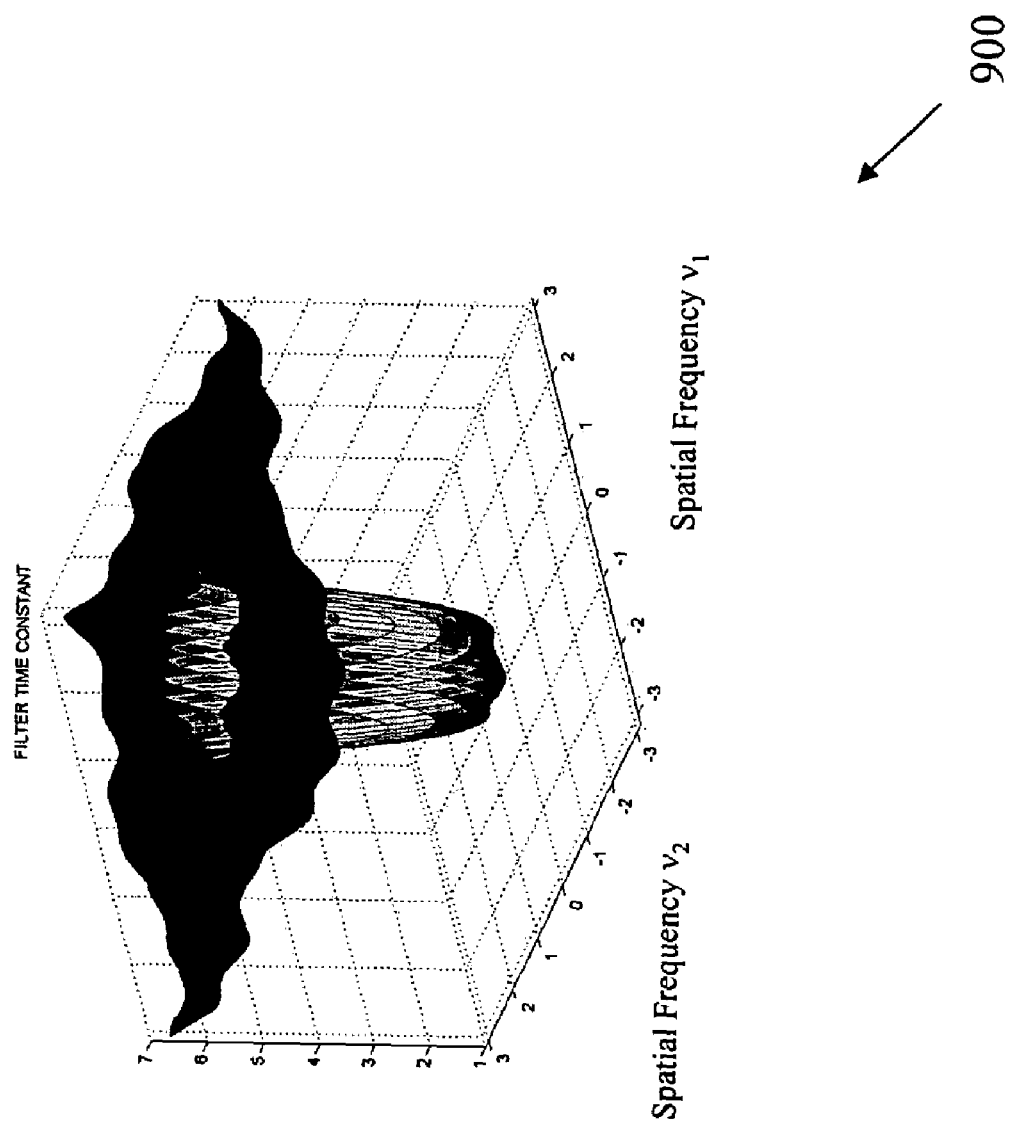
FIG. 9 is one embodiment of a dynamic time constant of the spatio-temporal filter shown in FIG. 3.

FIG. 9 is one embodiment of a dynamical time constant of the filter 300 of FIG. 3 shown generally at 900. The dynamical time constant 900 is a function of the two spatial frequencies $v_1$ and $v_2$. In accordance with the embodiments of the design requirements for the filter 300 above, the time constant in the stop band 502 is 6 to 7 times the sample rate leading to heavy time-filtering of the out-of-spatial-band signal. In the pass band the filter time constant is 2–3 times the sample rate providing a light filtering of the in-band-signal and, thus, little delay in observing the actual structural damage in the filtered signal.

Figure 10:
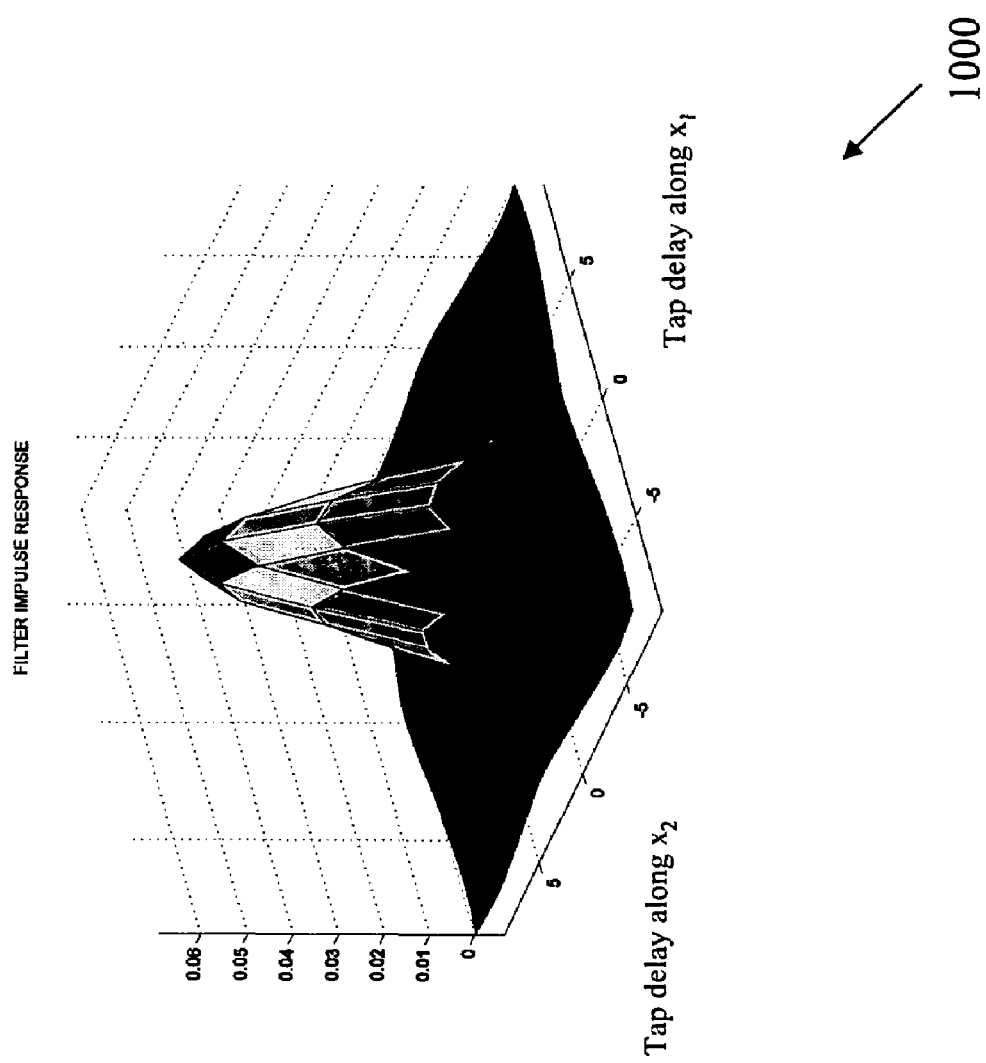
FIG. 10 is one embodiment of an impulse response of the spatio-temporal filter shown in FIG. 3.

FIG. 10 is one embodiment of a steady-state spatial impulse response of the filter 300 of FIG. 3 shown generally at 1000. In this embodiment, the steady-state impulse 1000 decays within 5–8 samples from the tap delay centers. This provides an estimate of how far the influence of the filter 300 would extend onto the spatial domain of the filtered signal.

Figure 11:
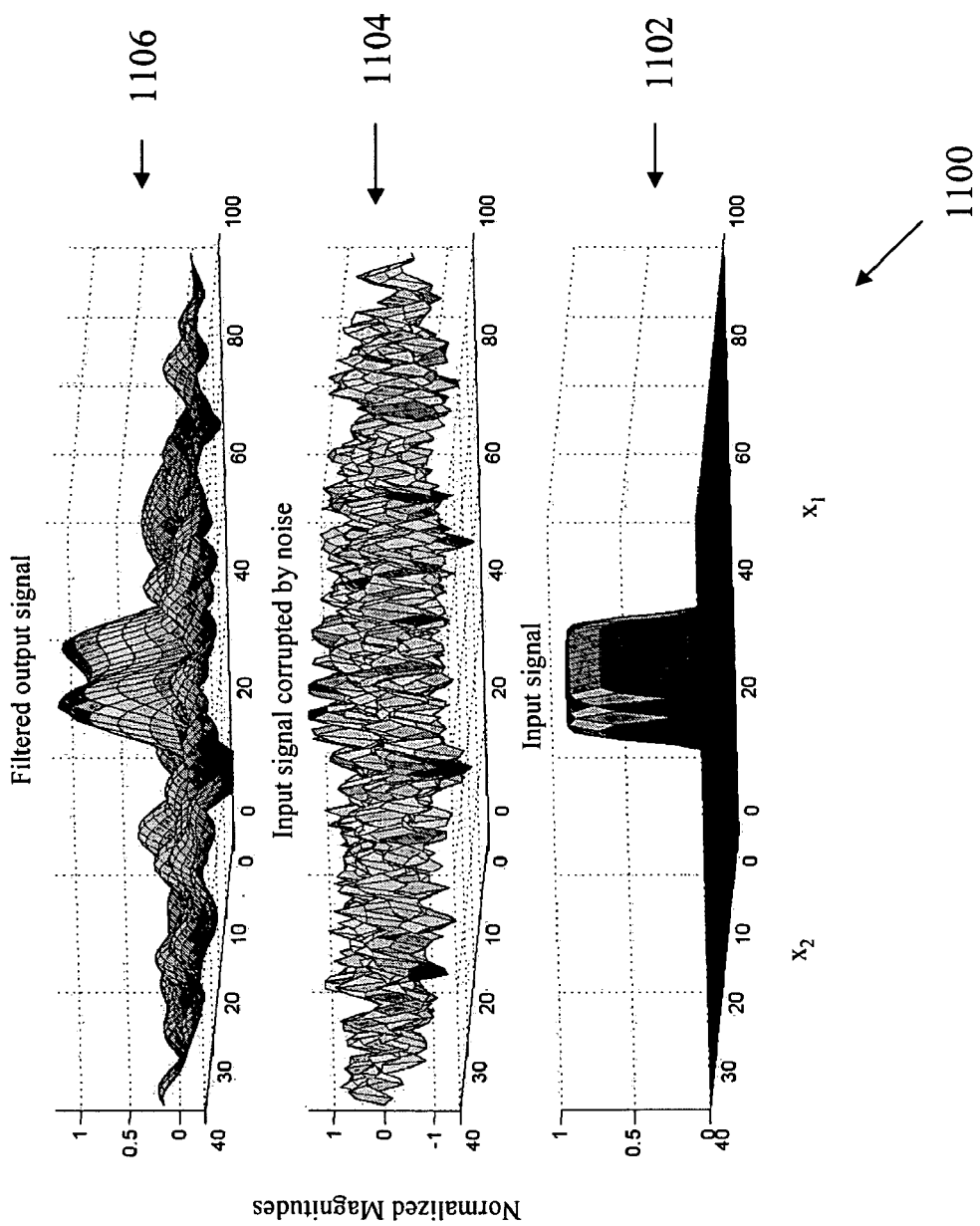
FIG. 11 is one embodiment of a simulation of the spatio-temporal filter shown in FIG. 3 in operation.

FIG. 11 is one embodiment of a simulation of the filter 300 in FIG. 3. In this embodiment, the filter 300 was applied to a noisy image sequence generated as follows. The spatial domain of 40×100 pixels was considered with the source signal (d) 1102 set to zero throughout the domain, except for an ellipse with axes of 8 (along $x_1$) and 20 (along $x_2$) at the center of the domain. The signal (d) 1102 was ramped up from zero to unity in 12 time steps uniformly inside the ellipse. The signal (d) 1102 was distorted by adding a (pseudo) random noise with noise values uniformly distributed in the interval [−2, 2] and uncorrelated in time and space coordinates. The noisy corrupted input signal was then smoothed (blurred) by applying a scaled Blackman window (a FIR operator [0.2024 0.5952 0.2024]) along directions $x_1$ and $x_2$. The signal 1102 combined with the noise and smoothed by the Blackman window generated a 3-D signal 1104 which is plotted in the middle plot in FIG. 11. The signal 1104 was used as an input to the filter 300 of FIG. 3. The blur, or point spread function of the synthetic signal was designed to be different from that assumed by the blur operator 308 of FIG. 3 to reflect the fact that in practice the blur might not be known accurately. After filter 300 filters the noisy signal, it generates a filtered data output 1106.

Figure 12:
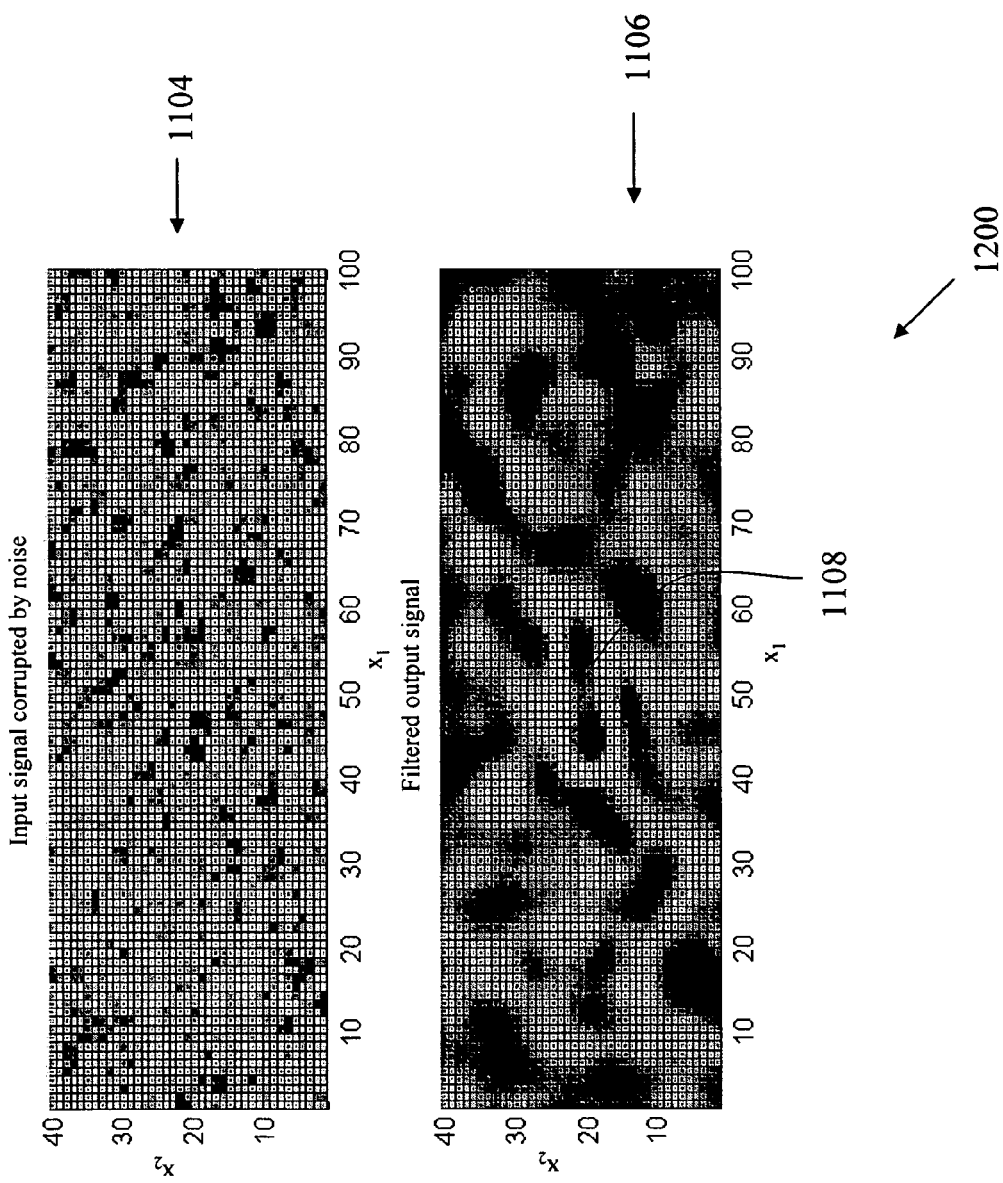
FIG. 12 is one embodiment of a pseudo-colored image of the filtered output and the input signal corrupted by noise of FIG. 11.

FIG. 12 is one embodiment of a pseudo-color image of the filtered output 1106 and the noise corrupted input signal 1104 of FIG. 11 shown generally at 1200. In this embodiment, a damage signal 1008 is clearly visible in the filtered output 1106.

Figure 13:
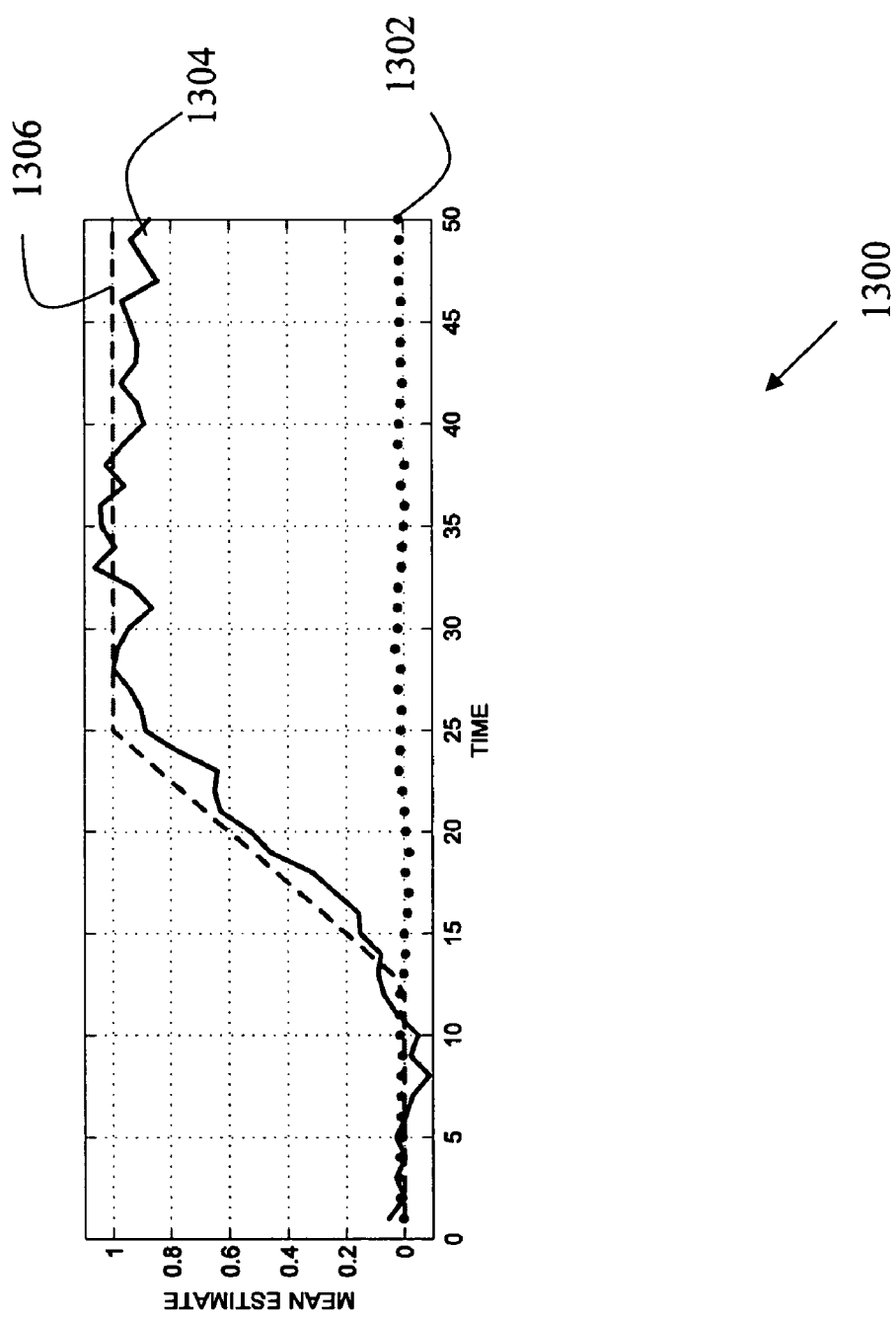
FIG. 13 is one embodiment of the time dependency of the filtered data of FIGS. 11 and 12.

FIG. 13 is one embodiment of the time dependency of the filtered data 1106 of FIGS. 11 and 12 shown generally at 1300. In this embodiment, the time dependency 1300 of the filtered data 1106 can be illustrated by taking average values inside the central ellipse of the filtered data 1106 and outside of the central ellipse. A time series 1304 for these average values for the filtered data 1106 is shown in FIG. 13. A source signal 1306, was the ramp time-function that was actually used when setting the input signal. The filtered line 1304 follows the source signal 1306 closely which demonstrate good dynamic performance of the filter 300. In comparison, outside signal 1302 shows an average value of the filtered signal 1106 computed for the data outside of the central ellipse. The outside signal 1302 is close to zero and shows that spurious signals at the filter 300 output are heavily suppressed.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A method for estimating damage to a structure, the method comprising:
    collecting a plurality of damage estimates over time;
    filtering the plurality of damage estimates with spatio-temporal filters;
    generating an enhanced damage estimate based on the filtered damage estimate; and
    storing the enhanced damage estimate.

2. The method of claim 1, wherein filtering the plurality of damage estimates comprises:
    forming a filtered structure damage estimate; and
    forming an actual structure damage estimate.

3. The method of claim 2, further comprising:
    updating the filtered structure damage estimate; and
    updating the actual structure damage estimate.

4. The method of claim 3, wherein updating the actual structure damage estimate comprises:
    computing a difference between the damage estimate and the filtered structure damage estimate computed at the previous update step;

performing a first convolution of the difference between the damage estimate and the filtered structure damage estimate with a feedback gain operator;
performing a second convolution of the actual structure damage estimate computed at the previous update step with a smoothing operator; and
combining the first and second convolution results and the actual structure damage estimate computed at the previous update step to obtain an updated actual structure damage estimate.

5. The method of claim 2, wherein filtering the plurality of damage estimates with spatio-temporal filters comprises:
performing a convolution of the actual structure damage estimate with a blur operator to form a filtered damage estimate.

6. A damage estimate system, the system comprising:
at least one sensor that collects damage estimate data as scans of the structure state;
a processing unit that receives the scans from the at least one sensor and generates a damage estimate from each scan; and
wherein the processing unit applies spatio-temporal filtering to the generated damage estimates to produce an enhanced damage estimate.

7. The system of claim 6, further comprising:
at least one sensor data concentrator adapted to receive the scans from the at least one sensor and digitize the scans.

8. The system of claim 6, further comprising:
a memory adapted to receive the damage estimates for each scan from the processing unit.

9. The system of claim 6, wherein the at least one sensor uses at least one of acoustic emission sensing, ultrasonic Lamb wave sensing, electrical conductivity sensing, and strain field sensing.

10. A machine-readable medium having instructions embodied thereon for a method for estimating damage to a structure, the method comprising:
collecting a plurality of damage estimates over time;
filtering the plurality of damage estimates with spatio-temporal filters;
generating an enhanced damage estimate based on the filtered damage estimate; and
storing the enhanced damage estimate.

11. The machine-readable medium of claim 10, wherein filtering the plurality of damage estimates comprises:
forming a filtered structure damage estimate; and
forming an actual structure damage estimate.

12. The machine-readable medium of claim 11, further comprising:
updating the filtered structure damage estimate; and
updating the actual structure damage estimate.

13. The machine-readable medium of claim 12, wherein updating the actual structure damage estimate comprises:
computing a difference between the damage estimate and the filtered structure damage estimate computed at the previous update step;
performing a first convolution of the difference between the damage estimate and the filtered structure damage estimate with a feedback gain operator;
performing a second convolution of the actual structure damage estimate computed at the previous update step with a smoothing operator; and
combining the first and second convolution results and the actual structure damage estimate computed at the previous update step to obtain an updated actual structure damage estimate.

14. The machine-readable medium of claim 11, wherein filtering the plurality of damage estimates with spatio-temporal filters comprises:
performing a convolution of the actual structure damage estimate with a blur operator to form a filtered damage estimate.

15. A damage estimate system, the system comprising:
means for sensing damage in an object, the means for sensing having an output;
means for estimating the damage of the object from the output of the means for sensing; and
means for filtering multiple outputs generated by the means for estimating in order to produce an enhanced damage estimate.

* * * * *